Sept. 2, 1941. H. L. FARR 2,254,516
BEARING
Filed Aug. 2, 1938

INVENTOR.
Howard L. Farr
BY
ATTORNEY.

Patented Sept. 2, 1941

2,254,516

UNITED STATES PATENT OFFICE 2,254,516

BEARING

Howard L. Farr, Olean, N. Y.

Application August 2, 1938, Serial No. 222,667

1 Claim. (Cl. 308—237)

My invention relates in general to bearings and more particularly to semi-cylindrical shell bearings.

My invention finds particular application for use as crank shaft and connecting rod bearings in engines where the conditions of operations are severe and exacting.

In the Indianapolis 500 mile race of this year, the largest failure which threw cars out of the race resulted from connecting rods. Five cars were eliminated because of this. The high pressure developed in the combustion chambers were particularly severe on rod bearings. Examination of bearings in cars that finished the race showed that in some instances they would have been fortunate to go even a few laps more. The Babbitt metal was pounded out very badly even on cars that were successful in finishing the race. Thus, there is need for a bearing which can "take it" a little better than babbitt. The use of copper-lead or cadmium-nickel bearings falls short of meeting all operating conditions because they are attacked by the fatty acids of the lubricant, which ultimately leads to scoring of the crank shaft. The use of any bearing is objectionable which has a steel support or back coated with a bearing material, because when the coating is pounded or otherwise removed or eaten away from the steel support or back, the crank shaft readily becomes severely galled, scored or scratched by the action of the two similar steel metals; namely, the steel support or back and the crank shaft, wearing against each other.

An object of my invention is a bearing constructed of an integral piece of metal composed of hard drawn copper.

Another object of my invention is the stamping and integrally forming of a thin semi-cylindrical bearing shell from a thin sheet of copper drawn to a hardness to maintain the shape of the semi-cylindrical shell and to withstand the bearing hammer action to which it is subjected.

Another object of my invention is the stamping and integrally forming of a thin semi-cylindrical bearing shell from a thin sheet of metal composed of copper.

Another object of my invention is the provision of a bearing which is not attacked by the fatty acids of the lubricant.

Other objects and a fuller understanding of my invention may be had by referring to the following description and claim, taken in conjunction with the accompanying drawing, in which:

Figure 2:
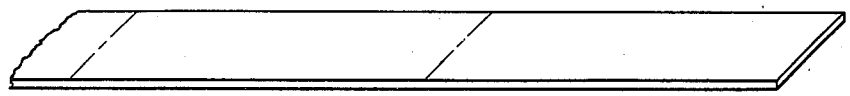
Figure 2 shows the thin sheet of copper after it is cold rolled and reduced in thickness to increase its hardness.
Figure 3:
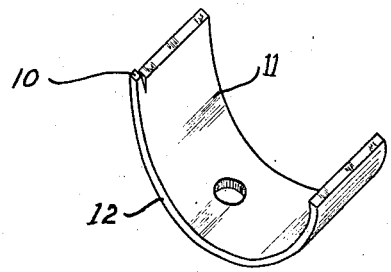
Figure 3 shows a semi-cylindrical bearing shell embodying the features of my invention.

With reference to the drawing, the semi-cylindrical bearing shell in Figure 3 embodying my invention is stamped and integrally formed by suitable dies from the thin sheet of copper shown in Figure 2. The small bent portion 10 of the bearing in Figure 3 fits into a groove in the bearing socket to keep the bearing from rotating within the socket.

Figure 1:
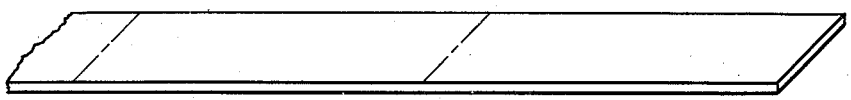
Figure 1 shows a piece of a thin sheet of soft copper from which my bearing may be constructed.

The thin sheet of copper in Figure 2 is hard drawn or tempered and may be constructed from the soft strip of copper in Figure 1 by cold rolling. The hardness or temper produced in a sheet of copper by final rolling is usually designated by the following table.

| Standard temper designation | Reduction in B & S gauge numbers | Plate, sheet, and strip, percent reduction in thickness |
|---|---|---|
| ⅛ hard | ½ | 6 |
| ¼ hard | 1 | 11 |
| ½ hard | 2 | 21 |
| ¾ hard | 3 | 29 |
| Hard | 4 | 37 |
| Extra hard | 6 | 50 |
| Spring | 8 | 60 |
| Extra spring | 10 | 68 |

Although the strip of copper may be rolled harder, I find from experience that a reduction in thickness of from 5 to 40 percent gives sufficient hardness to maintain the shape of the semi-cylindrical shell and to withstand the bearing hammer action to which the bearing is subjected. The specific reduction in thickness depends largely upon the size of the bearing and the duty or the hammer to which the bearing is subjected. Thus in the design of my bearing, the copper is drawn or rolled to a hardness greater than that to which it may be hammered by the bearing action in use.

The facing 11 of the bearing may be burnished by "dry rolling" the last rolling operation of the strip of copper; that is, making the final rolling without the use of any metal lubricant. The facing 11 may also be burnished by taking a suitable burnishing tool and working the facing surface after the semi-cylindrical shells are mated and mounted in the connecting rod socket.

The bearing shells may be stamped and integrally formed to fit existing engines and may be provided in oversized, undersized, or standard lots, with the facing 11 formed by the die to fit the crank shaft without too much scraping and fitting by the mechanic.

In my invention the facing 11 and the supporting body or back 12 are integrally formed and there is no opportunity for the facing to be pounded away as in the case of a two part bearing shell bonded together. The copper is not affected by the fatty acids of the lubricant. Thus, the possibility of galling, scoring and scratching the crank shaft is totally eliminated. In addition copper appears to absorb a certain amount of lubricant or has lubricating qualities itself, and will run longer without damage than other bearings. Actual tests show that a bearing constructed in accordance with my invention can "take it," even with heavily loaded trucks.

Tests prove that my bearings can stand up for long service, even though the crank shaft may be out-of-round. In one particular instance where the crank shaft was approximately .005 of an inch out-of-round, the longest that the best obtainable two part bonded bearing could stand up was three weeks, whereas when my bearings were installed, they stood up in good shape, as tests showed that when they were examined after almost two years' service they appeared substantially as good as new.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim as my invention:

A bearing comprising a thin semi-cylindrical copper shell having a supporting body and a facing integral therewith, said body and said facing being of a hardness between ½ hard to hard by standard temper designation.

HOWARD L. FARR.